(12) United States Patent
Tomiyama

(10) Patent No.: US 8,978,853 B2
(45) Date of Patent: Mar. 17, 2015

(54) LOCK-UP DEVICE FOR TORQUE CONVERTER

(75) Inventor: Naoki Tomiyama, Hirakata (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 14/005,875

(22) PCT Filed: Feb. 3, 2012

(86) PCT No.: PCT/JP2012/052515
§ 371 (c)(1),
(2), (4) Date: Sep. 18, 2013

(87) PCT Pub. No.: WO2012/140938
PCT Pub. Date: Oct. 18, 2012

(65) Prior Publication Data
US 2014/0008174 A1    Jan. 9, 2014

(30) Foreign Application Priority Data
Apr. 14, 2011 (JP) .................. 2011-089731

(51) Int. Cl.
*F16D 35/00* (2006.01)
*F16F 15/123* (2006.01)
*F16H 45/02* (2006.01)
*F16D 3/14* (2006.01)

(52) U.S. Cl.
CPC ............. *F16F 15/123* (2013.01); *F16H 45/02* (2013.01); *F16H 2045/0205* (2013.01); *F16H 2045/0231* (2013.01); *F16H 2045/0294* (2013.01); *F16D 3/14* (2013.01); *F16H 2045/0226* (2013.01); *F16H 2045/0278* (2013.01)
USPC ....................................... 192/3.28

(58) Field of Classification Search
USPC .......... 192/3.33, 55.61, 3.31, 3.3, 70.17, 212, 192/213, 1, 207, 200, 3.21, 3.28, 3.29, 66.1, 192/70.16, 70.11, 213.12, 213.11, 213.21, 192/213.22; 60/338; 74/574.2
See application file for complete search history.

(56) References Cited

U.S. PATENT DOCUMENTS

| 4,789,374 | A | * | 12/1988 | Suzuki | ................... 464/64.1 |
| 5,682,972 | A | * | 11/1997 | Sasada | ..................... 192/213 |
| 6,050,383 | A | | 4/2000 | Hashimoto et al. | |
| 8,342,306 | B2 | * | 1/2013 | Werner et al. | ............... 192/3.3 |
| 2009/0247307 | A1 | | 10/2009 | Ishikawa et al. | |
| 2011/0247322 | A1 | * | 10/2011 | Lindemann et al. | ........... 60/338 |
| 2012/0080280 | A1 | * | 4/2012 | Takikawa et al. | ......... 192/3.28 |
| 2012/0080281 | A1 | * | 4/2012 | Takikawa et al. | ......... 192/3.28 |
| 2012/0080282 | A1 | * | 4/2012 | Takikawa et al. | ......... 192/3.28 |

FOREIGN PATENT DOCUMENTS

| JP | 11-173382 A | 6/1999 |
| JP | 2006-029553 A | 2/2006 |
| JP | 2008-138797 A | 6/2008 |

(Continued)

*Primary Examiner* — Saul Rodriguez
*Assistant Examiner* — David J Hlavka
(74) *Attorney, Agent, or Firm* — Global IP Counselors, LLP

(57) ABSTRACT

The lock-up device includes an input rotary member, an output rotary member, a first torsion spring, a second torsion spring and a third torsion spring. The output rotary member is rotatable relatively to the input rotary member. Torque is transmitted to the first torsion spring from the input rotary member. The second torsion spring is disposed on a further inner peripheral side than the first torsion spring in a radial direction, and is configured to act in series with the first torsion spring. The third torsion spring is disposed on a further outer peripheral side than the second torsion spring in the radial direction, and is configured to act in series with the second torsion spring and transmit the torque to the output rotary member.

7 Claims, 10 Drawing Sheets

(56) References Cited

FOREIGN PATENT DOCUMENTS

| | | | |
|---|---|---|---|
| JP | 2009-156270 A | 7/2009 |
| JP | 2009-243599 A | 10/2009 |
| JP | 2011-002014 A | 1/2011 |
| WO | 2010043194 A1 | 4/2010 |

\* cited by examiner

LOCK-UP DEVICE FOR TORQUE CONVERTER

CROSS-REFERENCE TO THE RELATED APPLICATIONS

This U.S. national phase application claims priority to Japanese Patent Application No. 2011-089731 filed on Apr. 14, 2011. The entire disclosure of Japanese Patent Application No. 2011-089731 is hereby incorporated herein by reference

TECHNICAL FIELD

The present invention relates to a lock-up device, particularly to a lock-up device for a torque converter to transmit torque, and simultaneously, absorb and damp torsional vibration.

BACKGROUND ART

In many cases, a torque converter is provided with a lock-up device for directly transmitting torque from a front cover to a turbine. The lock-up device includes: a piston that can be frictionally coupled to the front cover; a retaining plate fixed to the piston; a plurality of pairs of coil springs supported by the retaining plate; and a driven plate elastically coupled to the piston through the plurality of pairs of coil springs in the rotational direction. The driven plate is fixed to the turbine (see PTL 1).

Here, the piston axially divides the space between the front cover and the turbine. Torque of the front cover is configured to be transmitted to the lock-up device when a friction facing annularly attached to the outer peripheral part of the piston is pressed onto a friction surface of the front cover. Accordingly, the torque is transmitted from the lock-up device to the turbine. Fluctuation in torque to be inputted from an engine is herein absorbed and damped by the plurality of pairs of coil springs disposed in the outer peripheral part of the lock-up device.

CITATION LIST

Patent Literature

PTL 1: Japan Laid-open Patent Application Publication No. JP-A-2008-138797

SUMMARY

Technical Problems

In the lock-up device described in Patent Literature 1 (hereinafter referred to as a well-known lock-up device), when the plurality of pairs of coil springs are compressed, the torsional characteristics of the plurality of pairs of coil springs are determined based on the torsional characteristic of a single pair of coil springs. In other words, it is required to set the torsional characteristic of the single pair of coil springs for determining the torsional characteristics of the plurality of pairs of coil springs.

A torsional characteristic indicates a relation between a torsional angle (a rotational angle) of the single pair of coil springs and the amount of fluctuation in torque that can be damped by the single pair of coil springs. Therefore, when the single pair of coil springs is compressed, fluctuation in torque corresponding to the torsional stiffness of the single pair of coil springs is damped.

The well-known lock-up device has had a linear torsional characteristic. Therefore, no choice has been left but to increase the torsional stiffness in attempting to damp a predetermined amount of fluctuation in torque with use of the torsional characteristic. However, when the torsional stiffness is increased too much, chances are that vibration attributed to coil springs is inevitably caused.

In view of the above, a configuration of setting two-stage torsional characteristics has been devised for solving the drawback. The configuration of setting the two-staged torsional characteristics can further suppress the vibration attributed to coil springs in comparison with a configuration of setting the linear (single-staged) torsional characteristic. However, when the target amount of damping fluctuation in torque is increased, such a drawback has been produced that the vibration attributed to coil springs cannot be completely suppressed even with the first torsional stiffness of the two-staged torsional characteristic.

It should be noted that the vibration attributed to coil springs includes, for instance, vibration generated in coil springs when the lock-up function is activated at an engine speed slightly higher than an idling engine speed and fluctuation in torque is abruptly inputted at this time.

On the other hand, when the first torsional stiffness (a first stage torsional stiffness) of the two-staged torsional characteristics is reduced for suppressing the vibration attributed to coil springs where the target amount of damping fluctuation in torque is large, initial vibration can be suppressed but the second torsional stiffness (a second stage torsional stiffness) is required to be increased for reliably achieving the target amount of damp. Therefore, in this case, the ratio of the second torsional stiffness with respect to the first torsional stiffness is inevitably increased, and therefore, chances are that vibration (jumping vibration) is inevitably generated anew in a torsional characteristic range greater than or equal to a bent point. In other words, even in this case, the drawback has been inevitably produced that the vibration attributed to coil springs cannot be completely suppressed.

The present invention has been produced in view of such drawback. It is an advantage of the present invention to provide a lock-up device for a torque converter whereby vibration attributed to coil springs can be reliably suppressed.

Solution to Problems

A lock-up device for a torque converter according to claim 1 is a device for transmitting a torque and for absorbing and damping a torsional vibration. The lock-up device includes an input rotary member, an output rotary member, a first coil spring, a second coil spring and a third coil spring.

The output rotary member is configured to be rotatable relatively to the input rotary member. The first coil spring is the one to which a torque is transmitted from the input rotary member. The second coil spring is disposed on a further inner peripheral side than the first coil spring in a radial direction. The second coil spring is configured to act in series with the first coil spring. The third coil spring is disposed on a further outer peripheral side than the second coil spring in the radial direction. The third coil spring is configured to act in series with the second coil spring. The third coil spring is configured to transmit the torque to the output rotary member.

In the present lock-up device, the torque of the engine is transmitted from the input rotary member to the output rotary member. When the torsional vibration is herein generated, the torsional vibration is absorbed and damped by at least any one of the first coil spring, the second coil spring and the third coil spring.

In this case, for instance, the first coil spring, the second coil spring and the third coil spring are compressed when the torque of the engine is inputted into the first coil spring from the input rotary member. Accordingly, the torsional vibration is absorbed and damped in accordance with the torsional stiffnesses of the respective coil springs (a first-stage torsional characteristic). When any one of the first coil spring, the second coil spring and the third coil spring is herein prevented from being compressed, the torsional vibration is absorbed and damped in accordance with the torsional stiffnesses of the compressible coil springs (a second-stage torsional characteristic). Further, when any two of the first coil spring, the second coil spring and the third coil spring are prevented from being compressed, the torsional vibration is absorbed and damped in accordance with the torsional stiffness of the single compressible coil spring (a third-stage torsional characteristic). It should be noted that the multi-staged torsional characteristics herein described are exemplary only for easy understanding of the action and a variety of changes can be made thereto without departing from the scope of the present invention.

According to the present lock-up device, it is possible to easily set multi-staged (e.g., at least three-staged) torsional characteristics by using the first coil spring, the second coil spring and the third coil spring.

Further, according to the present lock-up device, the torsional stiffness can be set to be less than that in the well-known art by disposing the first coil spring, the second coil spring and the third coil spring in series. Accordingly, wider torsional angles can be set for the coil springs. For example, the torsional stiffness under the condition that the first coil spring, the second coil spring and the third coil spring are actuated, e.g., the torsional stiffness in the first stage, can be set to be less than that in the well-known art. Therefore, the vibration attributed to the coil springs can be reliably suppressed. Thus, in the present lock-up device, torsional characteristics with wide angles and low stiffnesses can be implemented.

Further, in the present lock-up device, the ,second coil spring is disposed on the further inner peripheral side than the first coil spring and the third coil spring in the radial direction. Accordingly, a diagram, formed by connecting the axis of the first coil spring, the axis of the second coil spring and the axis of the third coil spring, has an inverted triangular shape in a cross-section including the rotary axis of the input rotary member and the output rotary member. Thus, the internal space of the torque converter can be effectively utilized by disposing the respective coil springs in the internal space of the torque converter.

Thus, according to the present lock-up device, the torsional stiffness can be set to be small, and therefore, torsional characteristics with wide angles and small stiffnesses can be implemented. Accordingly, the vibration attributed to the coil springs can be reliably suppressed. Further, according to the present lock-up device, it is possible to easily set three-or-more-staged torsional characteristics. Therefore, the ratio of the torsional stiffness of the present lock-up device can be set to be small. Accordingly, it is possible to suppress vibration to be generated when the respective bent points are exceeded in the torsional characteristics. Yet further, according to the present lock-up device, even when the number of coil springs to be disposed in the aforementioned cross-section is increased, such advantageous effects as described above can be obtained without changing the size of the torque converter by effectively disposing the first coil spring, the second coil spring and the third coil spring in the internal space of the torque converter.

A lock-up device for a torque converter according to claim 2 relates to the device recited in claim 1, and wherein the first coil spring is made up of a pair of coil springs and the pair of coil springs is disposed in series along a circumferential direction.

Here, the first coil spring is composed of a pair of coil springs. Further, the pair of coil springs is disposed in series. Therefore, the torsional stiffness of the first coil spring can be set to be smaller in comparison with the case that the first coil spring is composed of a single coil spring. Accordingly, it is possible to increase the torsional angle, and simultaneously, reliably suppress vibration that can be generated when the torsional angle is small.

A lock-up device for a torque converter according to claim 3 relates to the device recited in claim 1 or 2, and further includes a fourth coil spring. The fourth coil spring is disposed in an inner periphery of the first coil spring. The fourth coil spring has a free length shorter than that of the first coil spring.

In this case, for instance, when the torque of the engine is inputted into the first coil spring from the input rotary member, the first to third coil springs are compressed and the torsional vibration is absorbed and damped in accordance with the torsional stiffnesses of the respective coil springs (the first-stage torsional characteristic). When either one of the second coil spring and the third coil spring is herein prevented from being compressed, the torsional vibration is absorbed and damped in accordance with the torsional stiffness of the compressible coil spring (the second-stage torsional characteristic). Further, when the other of the second coil spring and the third coil spring is prevented from being compressed, the torsional vibration is absorbed and damped in accordance with the torsional stiffness of the first coil spring (the third-stage torsional characteristic). When the first coil spring is herein further compressed, the first coil spring and the fourth coil spring are compressed and the torsional vibration is absorbed and damped in accordance with the torsional stiffnesses of these coil springs (the fourth-stage torsional characteristic). It should be noted that the multi-staged torsional characteristics herein described are exemplary only for easy understanding of the action and a variety of changes can be made thereto without departing from the scope of the present invention.

According to the present lock-up device, it is possible to easily set multi-staged (e.g., four-staged) torsional characteristics by using the first to fourth coil springs . Accordingly, it is possible to increase the number of transitional points (bent points) from a given torsional characteristic to the next torsional characteristic. Therefore, the torsional characteristic for the entire system can be formed in a smooth curve. In other words, a torsional characteristic with less fluctuation can be formed. Further, in the fourth-stage torsional characteristic, the first coil spring and the fourth coil spring are compressed in parallel. Accordingly, the fourth-stage torsional stiffness can be increased, and therefore, a target torque can be easily obtained.

A lock-up device for a torque converter according to claim 4 relates to the device recited in any of claims 1 to 3, and wherein the third coil spring is disposed on a transmission side in the axial direction with reference to the first coil spring.

Here, the third coil spring is disposed on the axially transmission side with reference to the first coil spring. Further, as described above, the third coil spring is disposed on the outer peripheral side in the radial direction. Accordingly, the third coil spring can effectively utilize a surplus space occupying the radially outer part of the internal space of the torque converter. Therefore, even when the number of coil springs to be disposed on the aforementioned cross-section is increased, advantageous effects as described above can be obtained without changing the size of the torque converter.

A lock-up device for a torque converter according to claim 5 relates to the device recited in any of claims 1 to 4, and wherein the second coil spring and the third coil spring are disposed between the input rotary member and a fluid actuation chamber of the torque converter.

Here, the second coil spring and the third coil spring are disposed between the input rotary member and the fluid actuation chamber of the torque converter. Therefore, torque can be transmitted to the fluid actuation chamber (e.g., the turbine), while fluctuation in torque inputted into the first coil spring can be effectively damped.

A lock-up device for a torque converter according to claim 6 relates to the device recited in any of claims 1 to 5, and further includes compression restricting unit. The compression restricting unit is configured to restrict compression of at least any one of the first coil spring, the second coil spring and the third coil spring.

Here, compression of at least any one of the first coil spring, the second coil spring and the third coil spring is restricted by the compression restricting unit. Therefore, a damper action for absorbing and damping the torsional vibration is stopped in the coil spring prevented from being compressed. Accordingly, the bent points can be easily controlled, and therefore, the multi-stage torsional characteristics can be flexibly designed.

A lock-up device for a torque converter according to claim 7 relates to the device recited in any of claims 1 to 6, and wherein at least any one of the first coil spring, the second coil spring and the third coil spring is prevented from being compressed by causing coiled portions of the at least any one of the first coil spring, the second coil spring and the third coil spring to closely make contact with each other.

Here, compression of at least any one of the first coil spring, the second coil spring and the third coil spring is prevented by causing the coiled portions of the relevant coil spring/springs to closely make contact with each other, and thereby, the bent points are controlled. Accordingly, the bent points can be controlled without preparing a special mechanism or means. Therefore, the lock-up device can be reduced in its size. In other words, the torque converter can be reduced in its size.

DETAILED DESCRIPTION OF THE PREFERRED EMBODIMENTS

Figure 1:
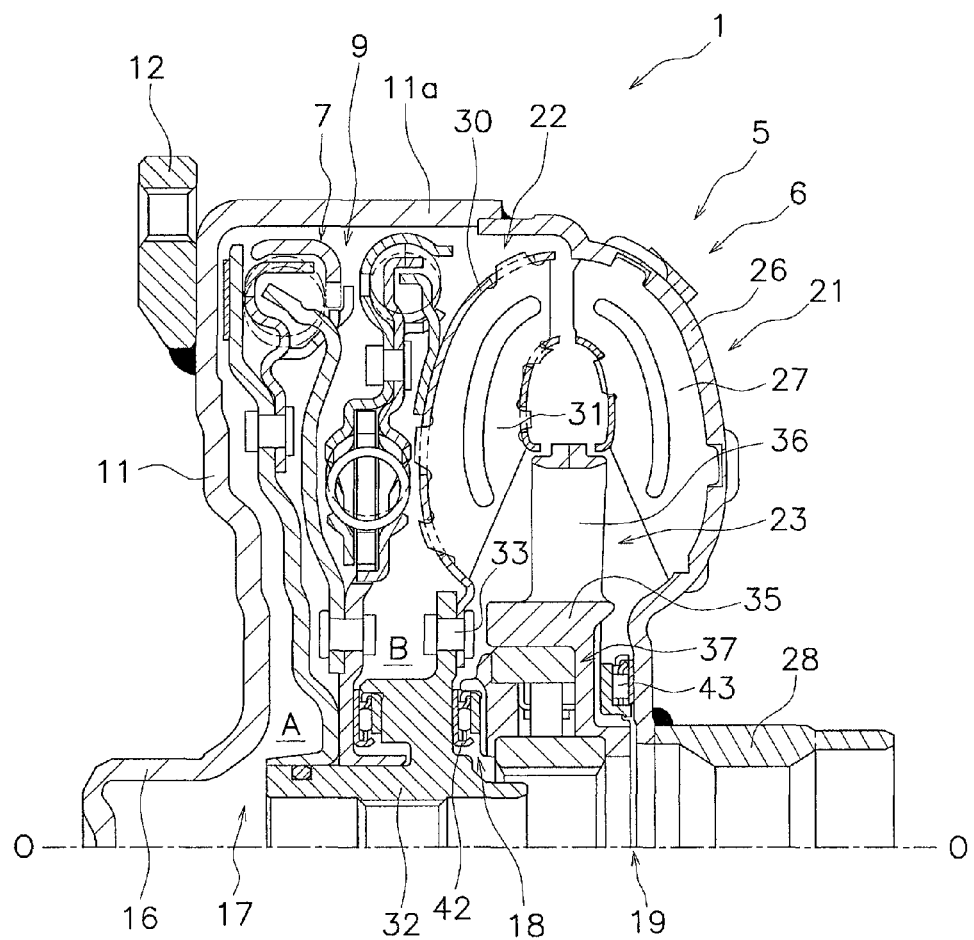
FIG. 1 is a partial cross-sectional view of a torque converter equipped with a lock-up device according to an exemplary embodiment of the present invention.
Figure 2:
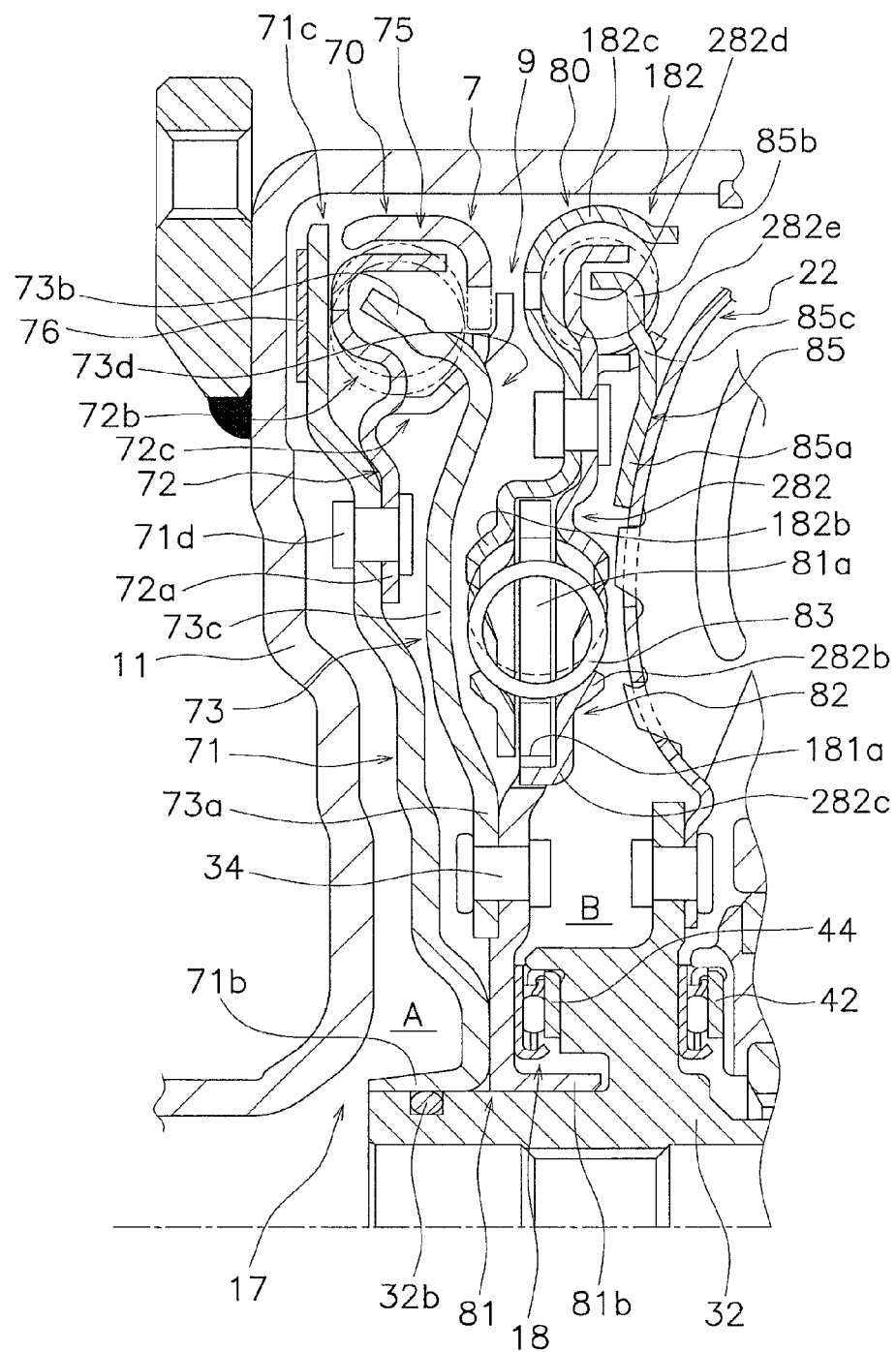
FIG. 2 is an enlarged cross-sectional view of the lock-up device.
Figure 3:
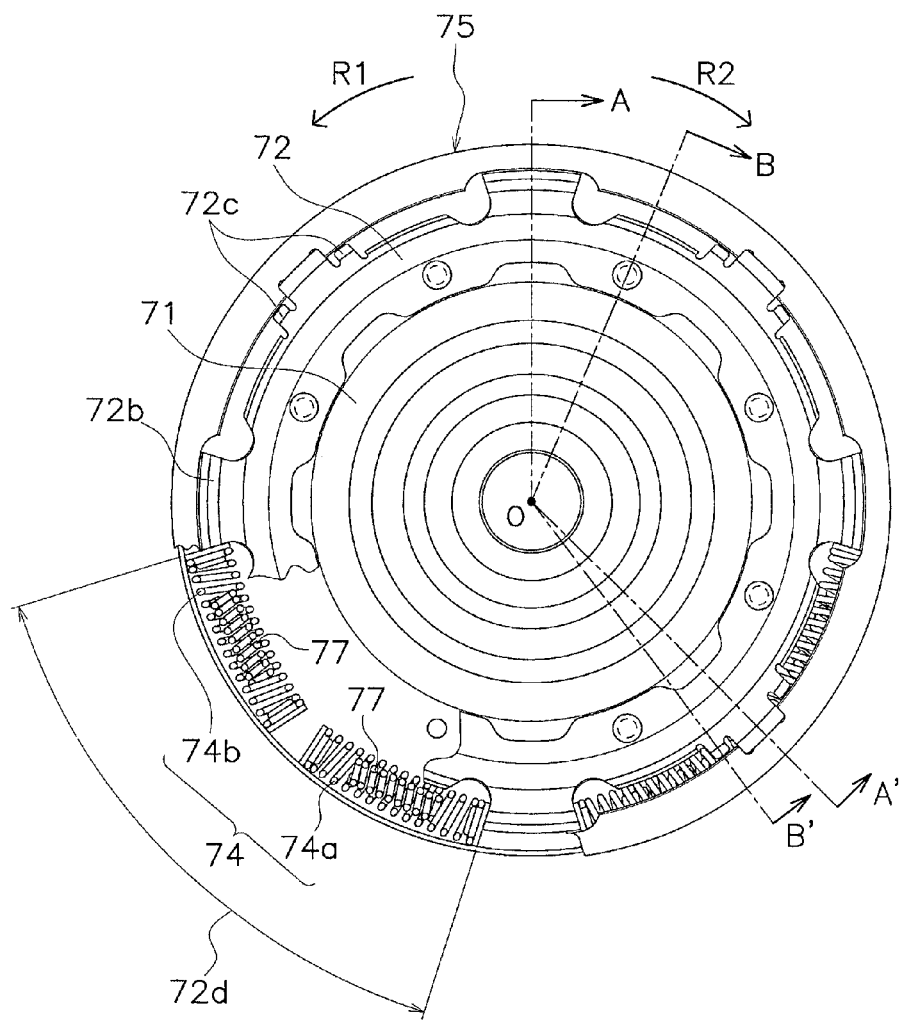
FIG. 3 is a front view of the lock-up device in which first and fourth torsion springs are seen from a transmission side.
Figure 4:
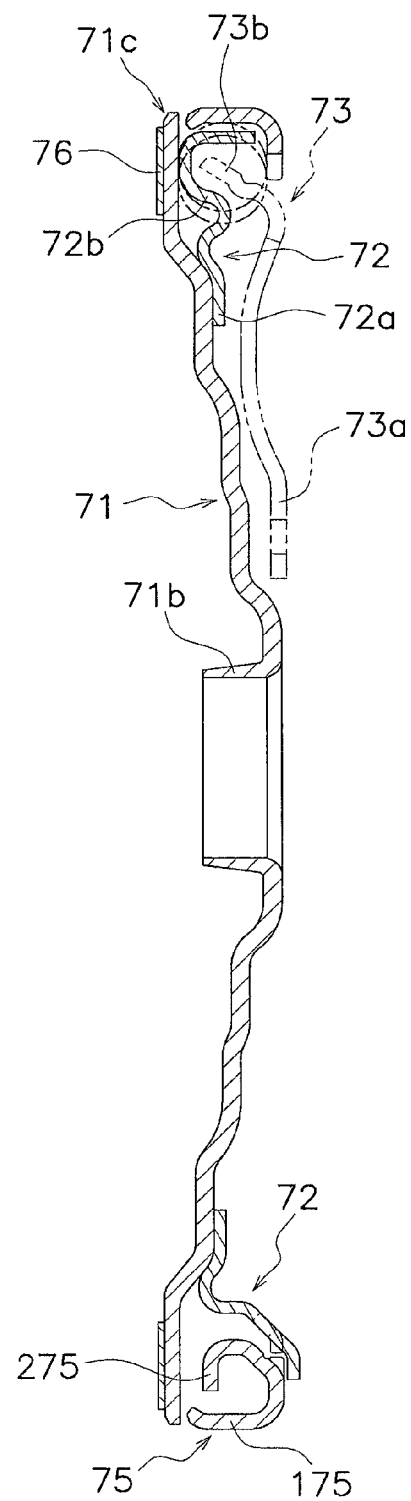
FIG. 4 is a cross-sectional view of the lock-up device (an A-A' cross-section).
Figure 5:
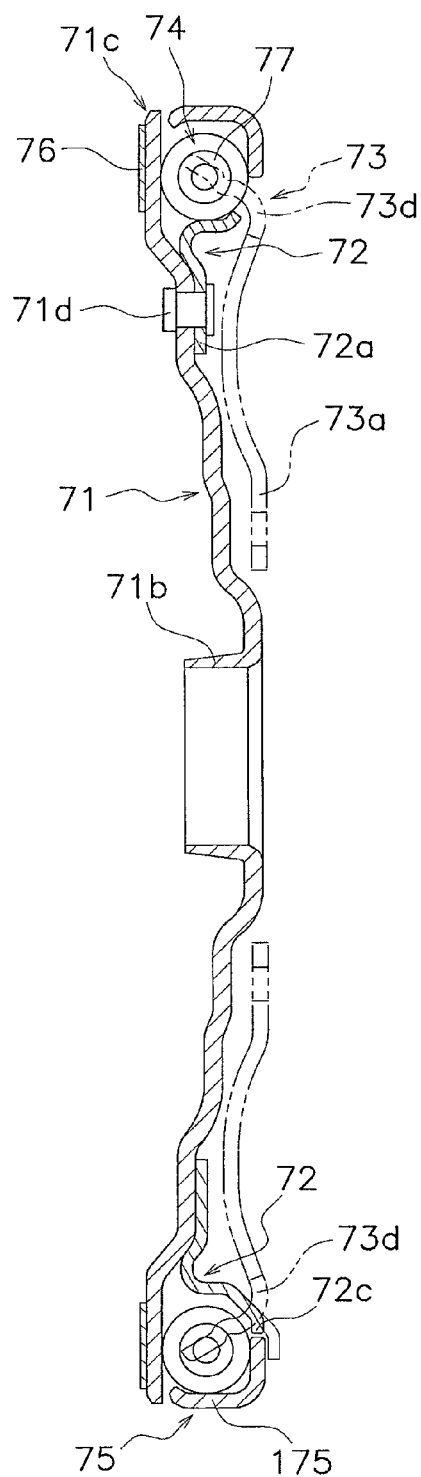
FIG. 5 is a cross-sectional view of the lock-up device (a B-B' cross-section).
Figure 6:
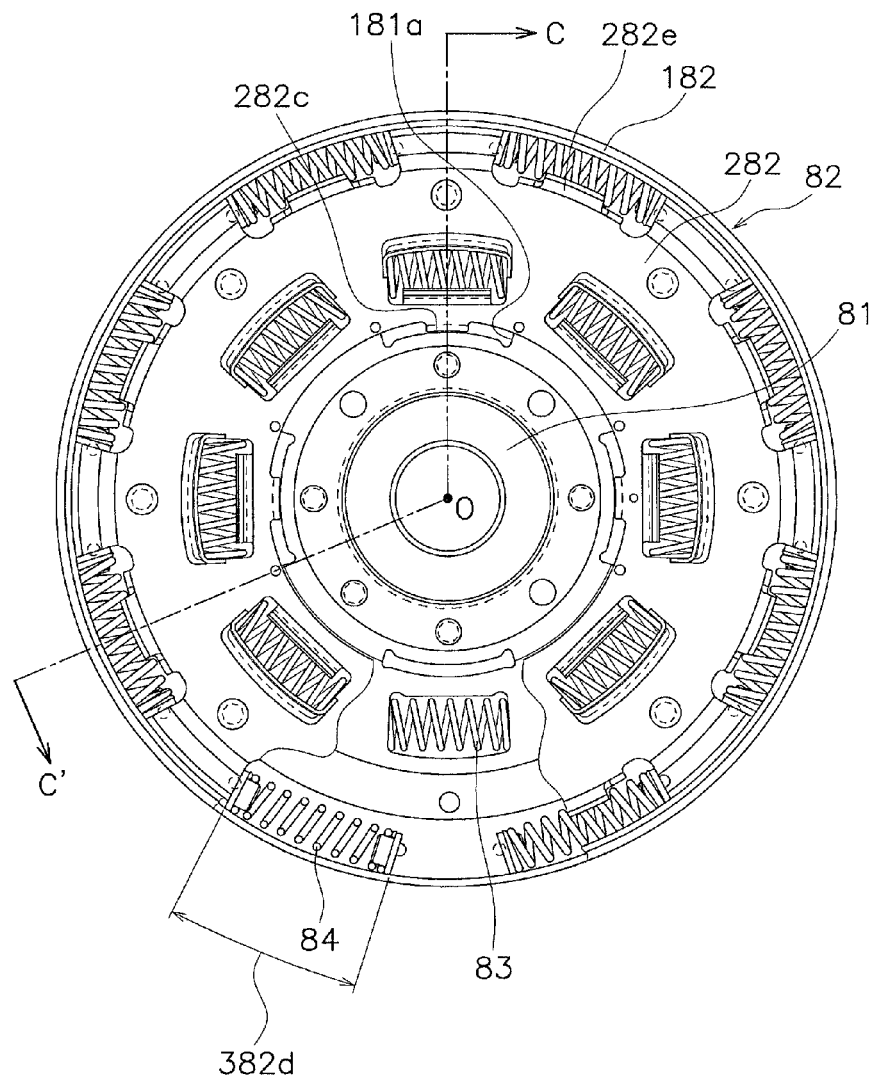
FIG. 6 is a front view of the lock-up device in which second and third torsion springs are seen from the transmission side.
Figure 7:
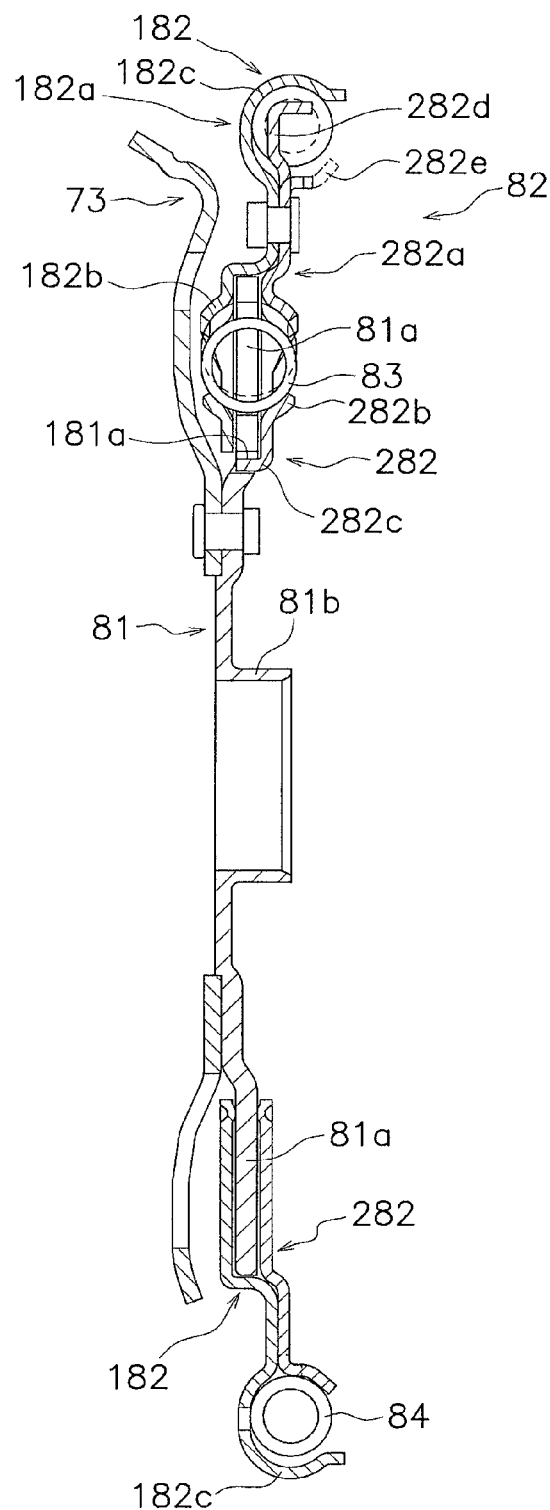
FIG. 7 is a cross-sectional view of the lock-up device (a C-C' cross-section).
Figure 8:
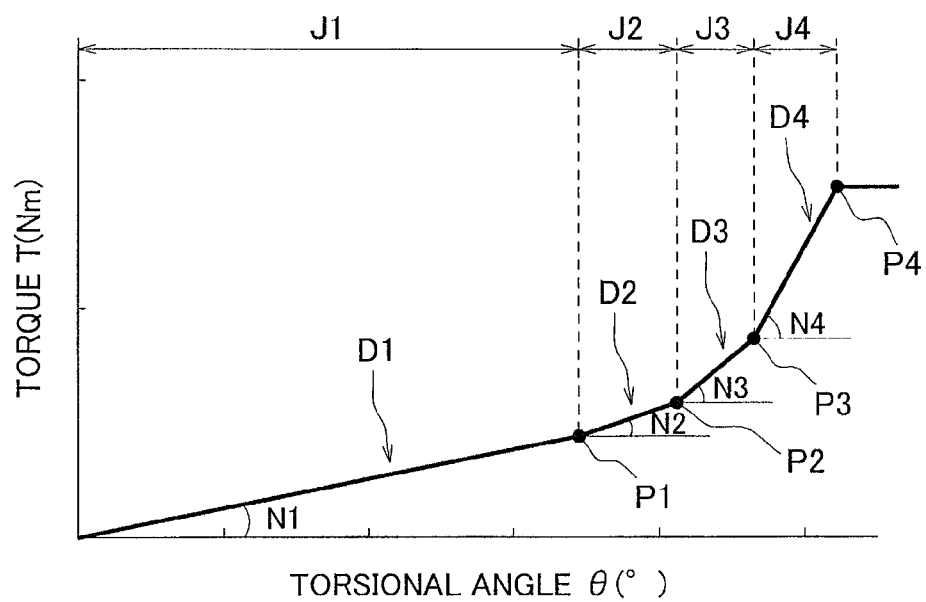
FIG. 8 is a chart representing torsional characteristics of the lock-up device.

FIG. 1 is a partial cross-sectional view of a torque converter 1 employing a lock-up device as exemplary embodiment of the present invention. In FIG. 1, an engine (not illustrated in the figure) is disposed on the left side, whereas a transmission (not illustrated in the figure) is disposed on the right side. A line "O-O" depicted in FIG. 1 indicates a rotary axis of the torque converter and the lock-up device. FIG. 2 is an enlarged cross-sectional view of the lock-up device. FIGS. 3 and 6 are partial front views of the lock-up device. FIGS. 4, 5 and 7 are cross-sectional views of the lock-up device. FIG. 8 is a chart representing multi-staged torsional characteristics. FIG. 9 includes model diagrams when coil springs are respectively actuated in the respective stages of the torsional characteristics.

Entire Structure of Torque Converter

The torque converter 1 mainly includes a flexible plate (not illustrated in the figures) and a torque converter main body 5. The flexible plate is formed by a disc-shaped thin member. The flexible plate is a member for transmitting torque and absorbing bending vibration to be transmitted from a crankshaft to the torque converter main body 5. Therefore, the flexible plate has stiffness enough to transmit torque in the rotational direction but has low stiffness in a bending direction.

The torque converter main body 5 includes: a front cover 11; a torus-shaped fluid actuation chamber 6 formed by three types of vane wheels (an impeller 21, a turbine 22 and a stator 23); and a lock-up device 7.

The front cover 11 is a disc-shaped member and is disposed adjacently to the flexible plate. The front cover 11 is provided with a center boss 16 on the inner peripheral end thereof. The center boss 16 is a cylindrical member axially extending, and is inserted into a center hole of the crankshaft.

The inner peripheral part of the flexible plate is fixed to the tip end surface of the crankshaft by a plurality of bolts (not illustrated in the figures). A plurality of nuts 12 are fixed to the outer peripheral part of the front cover 11 while being aligned at equal intervals in the circumferential direction. The outer peripheral part of the flexible plate is fixed to the front cover 11 by bolts (not illustrated in the figures) screwed into the nuts 12.

An outer peripheral side tubular portion 11a is formed on the outer peripheral part of the front cover 11 while extending axially towards the transmission. The outer peripheral edge of an impeller shell 26 of the impeller 21 is fixed to the tip end of the outer peripheral side tubular portion 11a by welding. As a result, a fluid chamber is formed by the front cover 11 and the impeller 21 while the inside thereof is filled with operating oil. The impeller 21 mainly includes: the impeller shell 26; a plurality of impeller blades 27 fixed to the inner side of the impeller shell 26; and an impeller hub 28 fixed to the inner peripheral part of the impeller shell 26.

The turbine 22 is disposed axially in opposition to the impeller 21 within the fluid chamber. The turbine 22 mainly includes: a turbine shell 30; a plurality of turbine blades 31 fixed to the impeller-side surface of the turbine shell 30; and a turbine hub 32 fixed to the inner peripheral edge of the turbine shell 30. The turbine shell 30 and the turbine hub 32 are fixed to each other by a plurality of rivets 33.

A spline to be engaged with an input shaft is formed on the inner peripheral surface of the turbine hub 32. The turbine hub 32 is thereby configured to be unitarily rotated with the input shaft.

The stator 23 is a mechanism for regulating the flow of the operating oil to be returned from the turbine 22 to the impeller 21. The stator 23 is a member integrally fabricated by casting of resin, aluminum alloy or the like. The stator 23 is disposed between the inner peripheral part of the impeller 21 and that of the turbine 22. The stator 23 mainly includes an annular stator shell 35 and a plurality of stator blades 36 mounted to the outer peripheral surface of the stator shell 35. The stator shell 35 is supported by a tubular stationary shaft (not illustrated in the figures) through a one-way clutch 37. The stationary shaft extend between the outer peripheral surface of the input shaft and the inner peripheral surface of the impeller hub 28.

The torus-shaped fluid actuation chamber 6 is formed within the fluid chamber by the respective shells 26, 30 and 35 of the respective vane wheels 21, 22 and 23 described above. It should be noted that an annular space 9 is reliably produced between the front cover 11 and the fluid actuation chamber 6 within the fluid chamber. It should be noted that the one-way clutch 37 illustrated in FIG. 1 has a structure using a ratchet, but can have a structure using rollers or sprags.

The operating oil is allowed to radially pass through an axial space between the inner peripheral part of the front cover 11 and the turbine hub 32. The pass-through portion is referred to as a first port 17. An oil path produced within the input shaft, a first hydraulic chamber A (to be described) and a space produced between the turbine 22 and the front cover 11 are communicated to each other through the first port 17.

Further, a first thrust bearing 42 is disposed between the turbine hub 32 and the inner peripheral part of the stator 23 (specifically, the one-way clutch 37). A second port 18, allowing the operating oil to pass back and forth therethrough in the radial direction, is formed in the part that the first thrust bearing 42 is disposed. In other words, the fluid actuation chamber 6 and an oil path produced between the input shaft and the stationary shaft are communicated to each other through the second port 18.

Further, a second thrust bearing 43 is disposed axially between the stator 23 (specifically, the shell 35) and the impeller 21 (specifically, the impeller hub 28). A third port 19, allowing the operating oil to pass back and forth therethrough in the radial direction, is formed in the part that the second thrust bearing 43 is disposed. In other words, the fluid actuation chamber 6 and an oil path produced between the stationary shaft and the impeller hub 28 are communicated to each other through the third port 19. It should be noted that the respective oil paths are connected to a hydraulic circuit (not illustrated in the figures) and are capable of independently supplying/discharging the operating oil to/from the first to third ports 17 to 19.

Structure of Lock-up Device

As illustrated in FIGS. 1 to 7, the lock-up device 7 is a mechanism disposed in the space 9 produced between the turbine 22 and the front cover 11 in order to mechanically couple the both components on an as-needed basis. The lock-up device 7 is disposed in the space produced axially between the front cover 11 and the turbine 22. The lock-up device 7 is entirely formed in a disc shape and divides the space 9 in a roughly axial direction. Here, the space produced between the front cover 11 and the lock-up device 7 is defined as the first hydraulic chamber A, whereas the space produced between the lock-up device 7 and the turbine 22 is defined as a second hydraulic chamber B.

The lock-up device 7 has a function of a clutch and that of an elastic coupling mechanism. The lock-up device 7 includes a first elastic coupling mechanism 70 and a second elastic coupling mechanism 80. The first elastic coupling mechanism 70 and the second elastic coupling mechanism 80 are connected in series.

As illustrated in FIGS. 2 to 5, the first elastic coupling mechanism 70 mainly includes a piston 71, a first drive plate 72, a first driven plate 73, first torsion springs 74, fourth torsion springs 77 and a spring holder 75.

The piston 71 is a member for coupling/decoupling of the clutch. The piston 71 functions as an input member in the lock-up device 7 functioning as an elastic coupling mechanism. The piston 71 is formed in a disc shape through which a center hole is bored. The piston 71 extends over the entire space 9 in the radial direction. An inner peripheral side tubular portion 71b is formed on the inner peripheral edge of the piston 71 while extending axially towards the engine. The inner peripheral side tubular portion 71b is supported by the engine-side outer peripheral surface of the turbine hub 32 while being movable in the rotational direction and the axial direction. It should be noted that the piston 71 is restricted from moving axially towards the transmission while making contact with a hub flange 81 disposed on the transmission side.

Further, an annular seal ring 32b is disposed on the engine-side outer peripheral surface of the turbine hub 32 while making contact with the inner peripheral surface of the inner peripheral side tubular portion 71b. Accordingly, axial sealing is achieved at the inner peripheral edge of the piston 71. Further, a friction coupling portion 71c is formed on the outer peripheral part of the piston 71. The friction coupling portion 71c is an annular portion having a predetermined length in the radial direction. The friction coupling portion 71c is formed in a planar shape that the both axial surfaces thereof are arranged perpendicular to the axial direction. An annular friction facing 76 is attached to the axially engine side of the friction coupling portion 71c. Thus, the clutch of the lock-up device 7 is formed by the piston 71 and the flat friction surface of the front cover 11. It should be noted that an axially extending tubular portion or the like is not formed on the outer peripheral edge of the piston 71.

The first drive plate 72 is disposed on the axially transmission side of the outer peripheral part of the piston 71. The first drive plate 72 is an annular member made of sheet metal. The first drive plate 72 includes a fixation portion 72a, first torque transmission portions 72b and first engaging portions 72c. The fixation portion 72a is fixed to the piston 71 by a plurality of rivets 71d while making contact with the axially transmission-side surface of the piston 71. The plural first engaging portions 72c extend from the fixation portion 72a to the outer peripheral side. More specifically, the first engaging portions 72c are formed on the axially transmission side of the outer peripheral part of the fixation portion 72a. The first engaging portions 72c are portions further protruding axially towards the transmission than the other portions.

The first torque transmission portions 72b outwardly extend from the fixation portion 72a. For example, the first torque transmission portions 72b are smoothly curved from inside to outside in the radial direction so that they are convexly formed towards the engine in the axial direction. Then, the first torque transmission portions 72b are smoothly curved so that they are convexly formed towards the transmission in the axial direction. Subsequently, the first torque transmission portions 72b are smoothly curved so that they are convexly formed towards the engine in the axial direction. Finally, the first torque transmission portions 72b extend axially towards the transmission. Spaces among adjacent first torque transmission portions 72b in the rotational direction are served as first spring accommodation portions 72d (see FIG. 3). In the present exemplary embodiment, the first spring accommodation portions 72d are formed in four positions.

The first torsion springs 74 are accommodated in the first spring accommodation portions 72d. Each first torsion spring 74 includes a pair of torsion springs 74a and 74b. The respective torsion springs 74a and 74b are springs extending in the circumferential direction. The first torsion springs 74 are members for elastically coupling the piston 71 as an input member and the first driven plate 73 in the rotational direction.

When described in detail, as illustrated in FIG. 3, each first torsion spring 74, composed of a pair of torsion springs 74a and 74b, is disposed in each first spring accommodation portion 72d such that it can act in series in the rotational direction. Further, the respective torsion springs 74a and 74b of each pair are formed such that the torsional stiffnesses thereof can be the same. Here, totally four sets of first torsion springs 74, i.e., totally eight torsion springs 74a and 74b, are used as a whole. The eight torsion springs 74a and 74b are respectively formed such that the free lengths thereof can be the same.

As illustrated in FIGS. 3 and 5, the fourth torsion springs 77 are disposed on the inner peripheral side of the respective torsion springs 74a and 74b of each pair disposed in each first spring accommodation portion 72d. Specifically, the fourth torsion springs 77 are formed such that the free lengths thereof can be shorter than those of the torsion springs 74a and 74b composing each first torsion spring 74. The fourth torsion springs 77 are disposed on the inner peripheral side of the torsion springs 74a and 74b while being movable in the rotational direction. Here, totally eight fourth torsion springs 77 are used as a whole. The eight fourth torsion springs 77 are respectively formed such that the free lengths thereof can be the same.

It should be herein noted that as illustrated in FIG. 3, in each first spring accommodation portion 72d, a reference sign "74a" is assigned to the torsion spring located on the rotational direction R1 side, while a reference sign "74b" is assigned to the torsion spring located on the rotational direction R2 side.

A set of torsion spring, composed of the first torsion spring 74 and the fourth torsion springs 77, acts in parallel in the rotational direction. More specifically, a set of torsion spring, composed of the torsion spring 74a and the fourth torsion spring 77, acts in parallel in the rotational direction. Likewise, a set of torsion spring, composed of the torsion spring 74b and the fourth torsion spring 77, acts in parallel in the rotational direction. Further, the torsion springs 74a and 74b act in series in the rotational direction.

The first driven plate 73 is a member for transmitting torque from the first torsion springs 74 to the hub flange 81. The first driven plate 73 mainly includes: a first attachment portion 73a; a plurality of first pawls 73b; and a coupling portion 73c for coupling the first attachment portion 73a and the plural first pawls 73b. The first attachment portion 73a is fixed to the hub flange 81 by, for instance, rivets 34. The plural first pawls 73b are bent axially towards the engine from the outer peripheral edge of the coupling portion 73c and then extend axially towards the engine.

The first pawls 73b are disposed in opposition to the first torque transmission portions 72b of the first drive plate 72. Specifically, the first pawls 73b are inserted from the axially transmission side into the first torque transmission portions 72b convexly curved towards the engine in the axial direction. Under the condition, the first pawls 73b make contact with the respective first torsion spring 74, i.e., both of the rotation-directional ends of the respective pairs of torsion springs 74a and 74b disposed in the respective first spring accommodation portions 72d.

Further, first stopper portions 73d are formed on the coupling portion 73c. The first stopper portions 73d are portions curved towards the engine on the outer peripheral part of the coupling portion 73c. The first stopper portions 73d are disposed among the first engaging portions 72c of the first drive plate 72 that are adjacent to each other in the circumferential direction. With the structure, compression of each first torsion spring 74 (74a, 74b), i.e., a damper action is stopped when the first drive plate 72 and the first driven plate 73 are rotated relatively to each other to a greater extent and each first stopper portion 73d makes contact with either one of the adjacent first engaging portions 72c in the rotational direction.

The first engaging portions 72c of the first drive plate 72 and the first stopper portions 73d of the first driven plate 73, which are herein described, function as a first compression restricting unit 91. In other words, the first compression restricting unit 91 includes the first engaging portions 72c of the first drive plate 72 and the first stopper portions 73d of the first driven plate 73.

The spring holder 75 is a support member for supporting the first torsion springs 74. Specifically, the spring holder 75 is a member for supporting the first torsion springs 74 in the radial direction. The spring holder 75 is disposed while being rotatable relatively to the piston 71 and the first driven plate 73. Further, the spring holder 75 is disposed while being rotatable relatively to the first drive plate 72 and the first driven plate 73.

As illustrated in FIGS. 3 to 5, the spring holder 75 mainly has a support portion 175 and engaging portions 275. The support portion 175 is a portion for supporting the first torsion springs 74. When described in detail, the support portion 175 is a portion for supporting the first torsion springs 74 that are moved radially outwards by centrifugal force. The engaging portions 275 are portions to be engaged with the respective pairs of torsion springs 74a and 74b composing the respective first torsion springs 74 in the rotational direction. The engaging portions 275 are integrally formed with the support portion 175.

The spring holder 75 functions as an intermediate float body. Here, torque is transmitted from the respective first torsion springs 74, i.e., the respective pairs of torsion springs 74a and 74b, to the spring holder 75 through the engaging portions 275. It should be noted that, when the fourth torsion springs 77 are compressed, the spring holder 75 receives transmission of torque not only from the first torsion springs 74 but also from the fourth torsion springs 77.

As illustrated in FIGS. 2, 6 and 7, the second elastic coupling mechanism 80 mainly includes the hub flange 81, a second drive plate 82, second torsion springs 83, third torsion springs 84 and a second driven plate 85.

The hub flange 81 is formed in a disc shape with a center hole. An inner peripheral side tubular portion 81b is formed on the inner peripheral edge of the hub flange 81 while extending axially towards the transmission. The inner peripheral side tubular portion 81b of the hub flange 81 is supported by the engine-side outer peripheral surface of the turbine hub 32 while being movable in the rotational direction. Further, the inner peripheral side tubular portion 81b of the hub flange 81 is interposed and held between the piston 71 and the turbine hub 32. When described in detail, a third thrust bearing 44 is disposed between the hub flange 81 and the turbine hub 32. The inner peripheral side tubular portion 81b of the hub flange 81 is interposed and held between the piston 71 and the turbine hub 32 through the third thrust bearing 44.

Further, a second torque transmission portion 81a is formed on the outer peripheral side of the hub flange 81. The second torque transmission portion 81a includes areas disposed among the second torsion springs 83 adjacent to each other in the circumferential direction. Further, the second torque transmission portion 81a makes contact with both of the rotation-directional ends of the respective second torsion springs 83. Furthermore, the second torque transmission portion 81a is disposed between a holding plate 182 and a torque transmission plate 282, which compose the second drive plate 82 to be described. Yet further, second engaging portions 181a are formed in the second torque transmission portion 81a. The second engaging portions 181a are disposed among the adjacent areas of the second torque transmission portion 81a in the rotational direction.

The second drive plate 82 includes the holding plate 182 and the torque transmission plate 282. The holding plate 182 is an annular member made of metal. The holding plate 182 has a holding plate main body 182a, second spring accommodation portions 182b and third spring accommodation portions 182c. The second spring accommodation portions 182b are portions for accommodating the second torsion springs 83. When described in detail, the second torsion springs 83 are disposed and accommodated between the second spring accommodation portions 182b and fourth spring accommodation portions 282b of the torque transmission plate 282 to be described. The plural second spring accommodation portions 182b are formed on the inner peripheral part of the holding plate main body 182a . Further, the plural second spring accommodation portions 182b are respectively formed in the holding plate main body 182a while being separated at predetermined intervals in the rotational direction.

The third spring accommodation portions 182c are portions for accommodating the third torsion springs 84. The third spring accommodation portions 182c are formed in the outer peripheral part of the holding plate main body 182a. When described in detail, the third spring accommodation portions 182c support the outer peripheral sides of the third torsion springs 84. In other words, the third spring accommodation portions 182c support the third torsion springs 84 in the radial direction. More specifically, the third torsion springs 84 are accommodated in the third spring accommodation portions 182c and fifth spring accommodation portions 382d of the torque transmission plate 282 to be described.

The torque transmission plate 282 is an annular member made of metal. The torque transmission plate 282 has a torque transmission plate main body 282a, the fourth spring accommodation portions 282b, second stopper portions 282c, third torque transmission portions 282d and third engaging portions 282e.

The torque transmission plate main body 282a is fixed to the holding plate main body 182a. For example, the torque transmission plate main body 282a is fixed to the holding plate main body 182a by rivets.

The fourth spring accommodation portions 282b are portions for accommodating the second torsion springs 83. The fourth spring accommodation portions 282b are formed in positions opposed to the second spring accommodation portions 182b of the holding plate 182. The second torsion springs 83 are disposed between the fourth spring accommodation portions 282b and the second spring accommodation portions 182b of the holding plate 182. Accordingly, the second torsion springs 83 are positioned. The plural fourth spring accommodation portions 282b are formed in the inner peripheral part of the torque transmission plate main body 282a. Further, the plural fourth spring accommodation portions 282b are respectively formed in the torque transmission plate main body 282a while being separated at predetermined intervals in the rotational direction.

The second torsion springs 83 springs extending in the circumferential direction. The second torsion springs 83 are members for elastically coupling the hub flange 81 and the second drive plate 82 (the torque transmission plate 282) in the rotational direction. As illustrated in FIG. 2, the second spring accommodation portions 182b and the fourth spring accommodation portions 282b are herein formed on the further inner peripheral side than the first spring accommodation portions 72d. In other words, the second torsion springs 83, disposed in the second spring accommodation portions 182b and the fourth spring accommodation portions 282b, are disposed on the further inner peripheral side in the radial direction than the first torsion springs 74.

Specifically, the second torsion springs 83 are disposed between the piston 71 and the fluid actuation chamber 6 (the turbine 22), while being disposed on the further inner peripheral side in the radial direction than the first torsion springs 74. More specifically, the second torsion springs 83 are disposed between the first driven plate 73 and the fluid actuation chamber 6 (the turbine 22) while being disposed on the further inner peripheral side in the radial direction than the first torsion springs 74.

The second stopper portions 282c are disposed among the second engaging portions 181a of the hub flange 81 that are adjacent to each other in the rotational direction. With the structure, compression of each second torsion spring 83, i.e., a damper action is stopped when the hub flange 81 and the torque transmission plate 282 are rotated relatively to each other to a greater extent and each second stopper portion 282c makes contact with either one of the adjacent second engaging portions 181a in the rotational direction. The second engaging portions 181a of the hub flange 81 and the second stopper portions 282c of the torque transmission plate 282, which are herein described, function as a second compression restricting unit 92. In other words, the second compression restricting unit 92 includes the second engaging portions 181a of the hub flange 81 and the second stopper portions 282c of the torque transmission plate 282.

The third torque transmission portions 282d extend radially outwards from the outer peripheral sides of the fourth spring accommodation portions 282b. More specifically, the third torque transmission portions 282d are curved from inside to outside in the radial direction such that they can be convexly formed axially towards the engine, and then extend axially towards the transmission. Spaces, produced among the third torque transmission portions 282d adjacent to each other in the rotational direction, are provided as the fifth spring accommodation portions 382d. In the present exemplary embodiment, the fifth spring accommodation portions 382d are formed in eight positions.

The third torsion springs 84 are accommodated in the fifth spring accommodation portions 382d. The third torsion springs 84 are springs extending in the circumferential direction. The third torsion springs 84 are members for elastically coupling the torque transmission plate 282 and the second driven plate 85 as an output member in the rotational direction.

Here, as illustrated in FIG. 2, the third spring accommodation portions 182c and the fifth spring accommodation portions 382d are formed on the further outer peripheral side than the second spring accommodation portions 182*b* and the fourth spring accommodation portions 282*b*. In other words, the third torsion springs 84, disposed in the third spring accommodation portions 182*c* and the fifth spring accommodation portions 382*d*, are disposed on the further outer peripheral side in the radial direction than the second torsion springs 83. Further, the third torsion springs 84 are disposed between the piston 71 and the fluid actuation chamber 6. Specifically, the third torsion springs 84 -are disposed between the first torsion springs 74 and the fluid actuation chamber 6 (the turbine 22), while being disposed on the further outer peripheral side in the radial direction than the second torsion springs 83.

The plural third engaging portions 282*e* extend axially towards the transmission on the outer peripheral side of the fourth spring accommodation portions 282*b*. More specifically, the third engaging portions 282*e* are formed on the axially transmission side of the outer peripheral part of the torque transmission plate main body 282*a*. The third engaging portions 282*e* are portions protruding further axially towards the transmission than the other portions.

The second driven plate 85 is a member for transmitting the torque from the third torsion springs 84 to the turbine 22. The second driven plate 85 is disposed on the outer peripheral part of the turbine shell 30 of the turbine 22. The second driven plate 85 mainly includes a second attached portion 85*a*, a plurality of second pawls 85*b* and third stopper portions 85*c*. The second attached portion 85*a* is fixed to the turbine shell 30 by, for instance, welding. The plural second pawls 85*b* are bent axially towards the engine from the outer peripheral edge of the second attached portion 85*a*. The second pawls 85*b* are disposed in opposition to the third torque transmission portions 282*d* of the torque transmission plate 282. Further, the second pawls 85*b* are inserted from the axially transmission side into the third torque transmission portions 282*d* convexly curved axially towards the engine. Under the condition, the second pawls 85*b* make contact with the both rotation-directional ends of the third torsion springs 84 disposed in the respective fifth spring accommodation portions 382*d*.

The third stopper portions 85*c* are formed between the second attached portion 85*a* and the second pawls 85*b*. The third stopper portions 85*c* are disposed among the third engaging portions 282*e* of the second drive plate 82 (the torque transmission plate 282) that are adjacent to each other in the rotational direction. With the structure, compression of each third torsion spring 84, i.e., a damper action is stopped when the second drive plate 82 and the second driven plate 85 are rotated relatively to each other to a greater extent and each third stopper portion 85*c* makes contact with either one of the adjacent third engaging portions 282*e* in the rotational direction. The third engaging portions 282*e* of the second drive plate 82 and the third stopper portions 85*c* of the second driven plate 85, which are herein described, function as a third compression restricting unit 93. In other words, the third compression restricting unit 93 includes the third engaging portions 282*e* of the second drive plate 82 and the third stopper portions 85*c* of the second driven plate 85.

Actions of Torque Converter

Immediately after starting of the engine, the operating oil is supplied into the torque converter main body 5 through the first port 17 and the third port 19 and is discharged through the second port 18. The operating oil, supplied through the first port 17, flows through the first hydraulic chamber A to the outer peripheral side, then flows through the second hydraulic chamber B and flows into the fluid actuation chamber 6. Therefore, the piston 71 is moved axially towards the transmission by difference between the hydraulic pressure in the first hydraulic chamber A and that in the second hydraulic chamber B. In other words, the friction facing 76 is separated away from the front cover 11, and a lock-up state is released. While the lock-up state is thus released, transmission of torque is performed between the front cover 11 and the turbine 22 by fluid drive between the impeller 21 and the turbine 22.

Overview of Actions of Lock-up Device

When the speed ratio of the torque converter 1 is increased and the rotation speed of the input shaft reaches a predetermined speed, the operating oil is discharged from the first hydraulic chamber A through the first port 17. As a result, the piston 71 is moved towards the front cover 11 by difference between the hydraulic pressure in the first hydraulic chamber A and that in the second hydraulic chamber B, and the friction facing 76 is pressed onto the flat friction surface of the front cover 11.

As a result, the torque of the front cover 11 is transmitted from the piston 71 to the second driven plate 85 through the respective members. The respective members, herein described, are the first drive plate 72, the first torsion springs 74, the first driven plate 73, the hub flange 81, the second torsion springs 83, the second drive plate 82, the third torsion springs 84 and so forth.

Further, torque is transmitted from the second driven plate 85 to the turbine 22. In other words, the front cover 11 is mechanically coupled to the turbine 22, and the torque of the front cover 11 is directly outputted to the input shaft through the turbine 22.

It should be noted that, when torsional vibration is inputted and the first torsion springs 74 are repeatedly compressed as described above, the first torsion springs 74 are moved radially outwards by centrifugal force and are slid along the spring holder 75. However, the spring holder 75 is a member configured to be moved together with the first torsion springs 74 in the rotational direction. Therefore, slide resistance is remarkably reduced between the both members 74 and 75 and a torsional vibration damping performance is sufficiently exerted.

Detailed Actions of Lock-up Device

In the aforementioned lock-up state (coupled state), the lock-up device 7 transmits torque, and simultaneously, absorbs and damps torsional vibration inputted thereto from the front cover 11. Specifically, when the torsional vibration is inputted into the lock-up device 7 from the front cover 11 and a torsional angle θ is produced between the first drive plate 72 and the second driven plate 85 as illustrated in FIG. 8, the first torsion springs 74 (74*a*, 74*b*) are compressed between the first drive plate 72 and the first driven plate 73 in the rotational direction. At this time, the spring holder 75 is moved in the compressed direction of the first torsion springs 74, and is rotated relatively to the first drive plate 72 and the first driven plate 73.

Further, at this time, the second torsion springs 83 are compressed between the hub flange 81 and the second drive plate 82 in the rotational direction. Yet further, the third torsion springs 84 are compressed between the second drive plate 82 and the second driven plate 85 in the rotational direction. The state that the first torsion springs 74, the second torsion springs 83 and the third torsion springs 84 are thus compressed is referred to as a first compressed state J1 (see FIG. 8).

When the torsional angle θ is further increased under the condition, the third compression restricting unit 93 functions and the compression of the third torsion springs 84 is restricted. In other words, the damper actions of the third torsion springs 84 are stopped. The state at this point of time corresponds to a first bent point P1 in FIG. 8. When the torsional angle θ is then further increased, the first torsion springs 74 are compressed between the first drive plate 72 and the first driven plate 73 in the rotational direction. Further, the second torsion springs 83 are compressed between the hub flange 81 and the second drive plate 82 in the rotational direction. The state is referred to as a second compressed state J2 (see FIG. 8).

When the torsional angle θ is further increased under the condition, the second compression restricting unit 92 functions and the compression of the second torsion springs 83 is restricted. In other words, the damper actions of the second torsion springs 83 are stopped. The state at this point of time corresponds to a second bent point P2 in FIG. 8. When the torsional angle θ is then further increased, the first torsion springs 74 are compressed between the first drive plate 72 and the first driven plate 73 in the rotational direction. The state is referred to as a third compressed state J3 (see FIG. 8).

When the torsional angle θ is further increased under the condition, the fourth torsion springs 77, disposed in the inner peripheries of the first torsion springs 74, are compressed together with the first torsion springs 74 in the rotational direction. The state that compression of the fourth torsion springs 77 is started at this point of time corresponds to a third bent point P3 in FIG. 8. When the torsional angle θ is then further increased, the first torsion springs 74 and the fourth torsion springs 77 are compressed between the first drive plate 72 and the first driven plate 73 in the rotational direction. The state is referred to as a fourth compressed state J4 (see FIG. 8).

When the torsional angle θ is further increased under the condition, the first compression restricting unit 91 functions and the compression of the first torsion springs 74 and that of the fourth torsion springs 77 are restricted. In other words, the damper actions of the first torsion springs 74 and those of the fourth torsion springs 77 are stopped. The state at this point of time corresponds to a fourth bent point P4 (a compression stopped state) in FIG. 8.

Torsional Vibration Damping Characteristics of Lock-up Device

Explanation will be hereinafter made for the torsional characteristics where the first to fourth torsion springs 74, 83, 84 and 77 are actuated as described above.

Figure 9A:
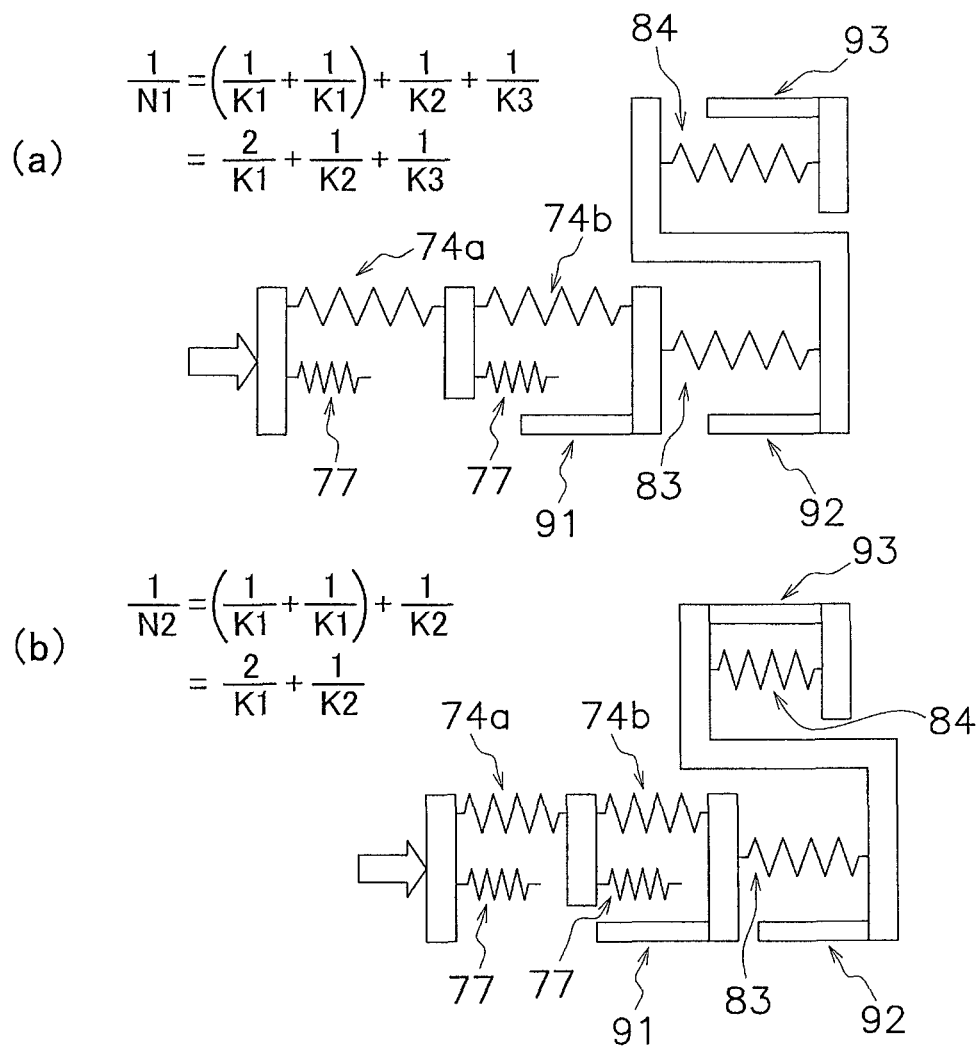
FIG. 9A is a model diagram of the lock-up device when torsion springs are actuated.
Figure 9B:
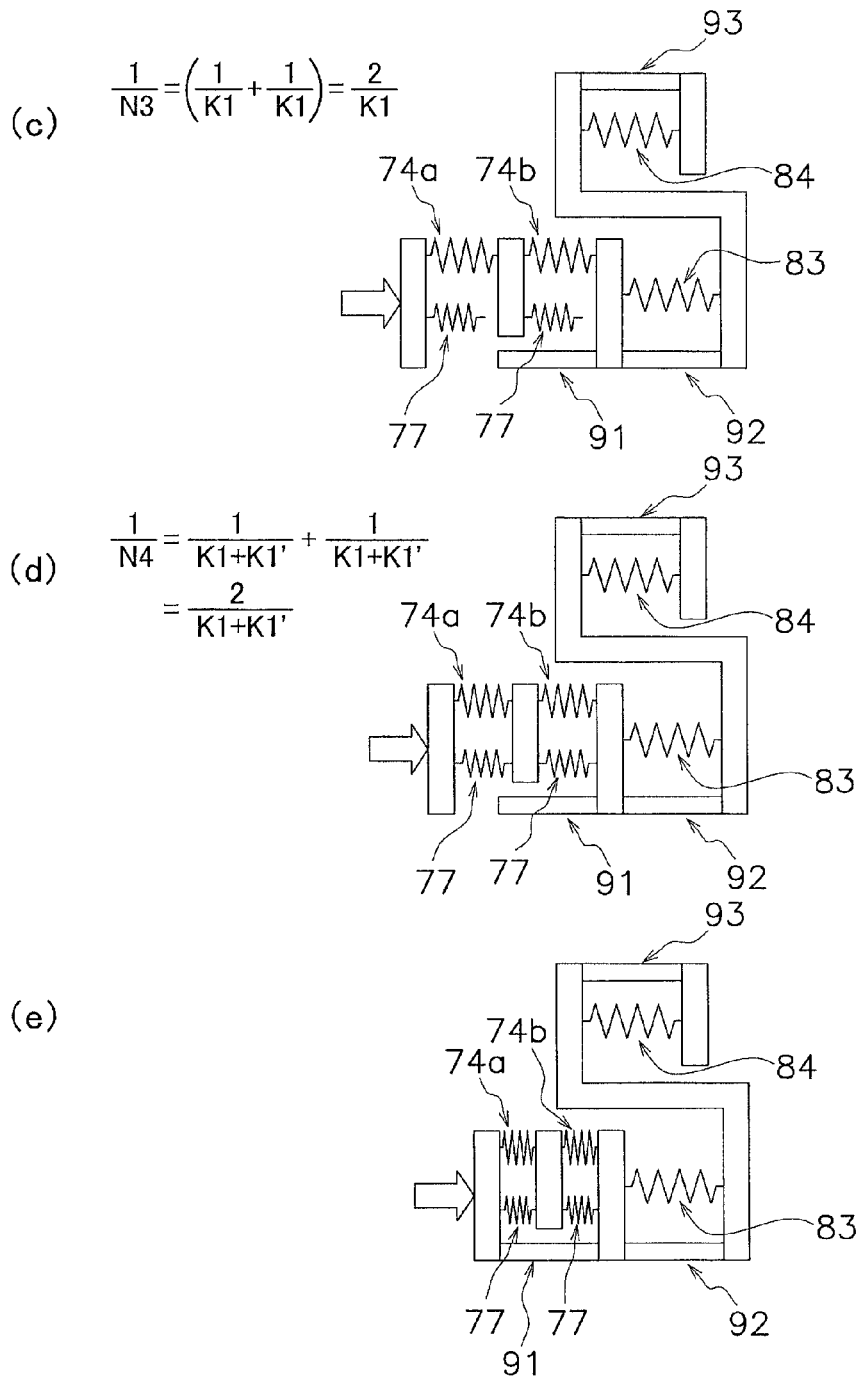
FIG. 9B is a model diagram of the lock-up device when torsion springs are actuated.

As represented in FIGS. 8 and 9, in the first compressed state J1, a torsional stiffness N1 $(=1/[2/K1+1/K2+1/K3])$ of the first to third torsion springs 74 (74a, 74b), 83 and 84 disposed in series is set as the torsional stiffness N1 in a system (see FIG. 9(a)). Accordingly, a first gradient D1 of the torsional characteristic is set based on the torsional stiffness N1 in the system. Next, in the second compressed state J2, a torsional stiffness N2 of the two torsion springs, i.e., the first and second torsion springs 74 (74a, 74b) and 83 $(=1/[2/K1+1/K2])$ is set as the torsional stiffness N2 in the system (see FIG. 9(b)). Accordingly, a second gradient D2 of the torsional characteristic is set based on the torsional stiffness N2 in the system.

Next, in the third compressed state J3, a torsional stiffness N3 of the first torsion springs 74 (74a, 74b) $(=1/[2/K1])$ is set as the torsional stiffness N3 in the system (see FIG. 9 (c)). Accordingly, a third gradient D3 of the torsional characteristic is set based on the torsional stiffness N3 in the system. Subsequently, in the fourth compressed state J4, a torsional stiffness N4 of the first and fourth torsion springs 74 (74a, 74b) and 77 $(=1/[2/(K1+K1')])$ is set as the torsional stiffness N4 in the system (see FIG. 9(d)). Accordingly, a fourth gradient D4 of torsional characteristic is set based on the torsional stiffness N4 in the system.

Finally, when the fourth compressed state J4 is transitioned to the compression stopped state P4 (the fourth bent point), the compression of all the torsion springs 74 (74a, 74b), 83 and 84 is restricted (see FIG. 9(e)) and torque reaches its maximum. Thus, four-staged torsional characteristics are set.

Advantageous Effects of Torsional Vibration Damping Characteristics

In the present lock-up device 7, multi-staged (i.e., four staged) torsional characteristics can be set. By thus setting four-staged torsional characteristics, the torsional stiffnesses N1, N2, N3 and N4 can be set to be gradually increased without being acutely changed. When described in detail, in the present lock-up device 7, the ratio of torsional stiffness can be set to be small by setting the four-staged torsional characteristics. For example, in the present lock-up device 7, it is possible to set the ratio of torsional stiffness, for instance, the ratio of the second torsional stiffness to the first torsional stiffness (N2/N1) and the ratio of the third torsional stiffness to the second torsional stiffness (N3/N2), to be smaller in comparison with a case of setting two-staged or three-staged torsional characteristics. Accordingly, it is possible to suppress vibration to be produced when the respective bent points are exceeded in the torsional characteristics.

Further, in the present lock-up device 7, the first bent point P1, the second bent point P2 and the fourth bent point P4 are set by the first to third compression restricting units 91, 92 ad 93. Accordingly, the bent points P1, P2 and P4 can be easily controlled. Therefore, multi-staged torsional characteristics can be easily designed. Further, the bent points P1, P2 and P4 can be accurately set. Therefore, the torsional stiffness can be reliably changed. In other words, torque desired by a designer can be reliably transmitted from the input side to the output side.

Further, in the present lock-up device 7, the torsional stiffness can be set to be smaller than that in the well-known art by disposing the first torsion springs 74, the second torsion springs 83 and the third torsion springs 84 in series. Accordingly, a wider torsional angle can be set for the coil springs. For example, the torsional stiffness under the condition that the first torsion springs 74, the second torsion springs 83 and the third torsion springs 84 are actuated, e.g., the first stage torsional stiffness, can be set to be smaller than that in the well-known art . Therefore, the vibration attributed to the coil springs can be reliably suppressed. Thus, in the present lock-up device 7, torsional characteristics with wider angles and low stiffnesses can be implemented.

Further, in the present lock-up device 7, the second torsion springs 83 are disposed on the further inner peripheral side in the radial direction than the first torsion springs 74 and the third torsion springs 84. In other words, the first torsion springs 74 and the third torsion springs 84 are disposed on the outer peripheral side in the radial direction within the internal space of the torque converter. With the structure, the internal space of the torque converter can be effectively utilized. Therefore, even when the number of torsion springs is increased, advantageous effects as described above can be obtained without changing the size of the torque converter.

Further, in the present lock-up device 7, the second torsion springs 83 and the third torsion springs 84 are disposed between the piston 71 and the fluid damping member 6 of the torque converter. Therefore, torque can be transmitted to the fluid actuation chamber 6 (e.g., the turbine 22), while fluctuation in torque inputted into the first torsion springs 74 can be effectively damped.

Further, in the present lock-up device 7, each first torsion spring 74 is composed of a pair of torsion springs, and the torsion springs of the pair are disposed in series. Therefore, the torsional stiffness of each first torsion spring 74 can be further reduced than that of each first torsion spring 74 composed of a single torsion spring. Therefore, it is possible to reliably suppress vibration that can be produced when the torsional angle is small, for instance, vibration to be produced where the lock-up device 7 is actuated with the torsional stiffness of the first stage.

Further, in the present lock-up device 7, the free length of each fourth torsion spring 77 is set to be shorter than that of each first torsion spring 74. Yet further, each fourth torsion spring 77 is disposed in the inner periphery of each first torsion spring 74. Accordingly, a transitional point (the third bent point P3) from a given torsional characteristic to the next torsional characteristic can be added to the torsional characteristics. Therefore, the torsional characteristic for the entire system can be formed in a smooth curve. In other words, the torsional characteristic with less fluctuation can be formed. Further, in the fourth stage torsional characteristic, the first torsion springs 74 and the fourth torsion springs 77 are compressed in parallel. Accordingly, the fourth stage torsional stiffness can be increased. Therefore, a target torque can be easily obtained.

Other Exemplary Embodiments (a) In the aforementioned exemplary embodiment, the case has been exemplified that the compression of the first to third torsion springs 74, 83, 84 is restricted by the first to third compression restricting units 91, 92 and 93. However, at least any one of the first to third torsion springs 74, 83 and 84 can be prevented from being compressed by causing the coiled portions thereof to closely make contact with each other. For example, the compression of the torsion springs can be prevented by using the compression restricting units 91, 92 and 93 with respect to given torsion springs and by causing the coiled portions of the other torsion springs to closely make contact with each other.

Industrial Applicability

The present invention can be used for a lock-up device of a torque converter to transmit torque and simultaneously absorb and damp torsional vibration.

Advantageous Effects of Invention

According to the present invention, the vibration attributed to coil springs can be reliably suppressed in the lock-up device for a torque converter.

The invention claimed is:

1. A lock-up device for a torque converter to transmit a torque and absorb and damp a torsional vibration, comprising:
an input rotary member;
an output rotary member configured to be rotated around a rotation axis relatively to the input rotary member;
a first coil spring to which the torque is transmitted from the input rotary member;
a second coil spring disposed closer to the rotation axis than the first coil spring to the rotation axis in a radial direction, the second coil spring being configured to transmit the torque and act in series with the first coil spring; and
a third coil spring disposed further from the rotation axis than the second coil spring from the rotation axis in the radial direction, the third coil spring being configured to transmit the torque and act in series with the second coil spring, the third coil spring being configured to transmit the torque to the output rotary member, the torque being transmitted from the input rotary member to the output rotary member, in order, through the first coil spring, the second coil spring and the third coil spring.

2. The lock-up device recited in claim 1, wherein
the first coil spring includes first and second portion coil springs, and
the first and second portion coil springs are arranged next to each other along a circumferential direction.

3. The lock-up device recited in claim 1, further comprising a fourth coil spring disposed in the first coil spring, wherein the fourth coil spring has a free length shorter than a free length of the first coil spring.

4. The lock-up device recited in claim 1, wherein
the third coil spring is disposed on a transmission side in an axial direction with reference to the first coil spring.

5. The lock-up device recited in claim 1, wherein
the second coil spring and the third coil spring are disposed between the input rotary member and a fluid actuation chamber of the torque converter.

6. The lock-up device recited in claim 1, further comprising a compression restricting unit being configured to restrict compression of at least one of the first coil spring, the second coil spring, and the third coil spring.

7. The lock-up device recited in claim 1, wherein
when a torsional angle between the input rotary member and the output rotary member is larger than a prescribed value, at least one of the first coil spring, the second coil spring, and the third coil spring is prevented from being compressed.

* * * * *